(12) United States Patent
De Prete, III

(10) Patent No.: US 6,407,365 B1
(45) Date of Patent: Jun. 18, 2002

(54) AUTOMATED SUNSHADE AND DEFROSTING ASSEMBLY

(76) Inventor: Frank Joseph De Prete, III, 1210-1/2 Chesterfield Ave., Lancaster, SC (US) 29720

( * ) Notice: Subject to any disclaimer, the term of this patent is extended or adjusted under 35 U.S.C. 154(b) by 0 days.

(21) Appl. No.: 09/860,335

(22) Filed: May 18, 2001

(51) Int. Cl.$^7$ .................................................. B60J 3/00
(52) U.S. Cl. ............ 219/203; 160/370.21; 160/DIG. 3; 296/97.4; 296/97.5; 296/97.11
(58) Field of Search ................................. 219/203, 528, 219/535; 160/370.21, 370.22, 370.23, DIG. 3; 296/97.5, 97.4, 97.11, 97.9, 97.8; 52/171.2

(56) References Cited

U.S. PATENT DOCUMENTS

| | | | |
|---|---|---|---|
| 1,743,638 A | * 1/1930 | Tefft | 219/549 |
| 3,624,354 A | 11/1971 | Heidorn | |
| 4,004,126 A | 1/1977 | Boaz | |
| D293,428 S | 12/1987 | Watts | |
| 5,038,844 A | * 8/1991 | Edmonds et al. | 160/370.21 |
| 5,290,085 A | 3/1994 | Takagi | |
| 5,751,488 A | 5/1998 | Wade | |
| 5,804,799 A | 9/1998 | Stewart | |
| 5,860,466 A | * 1/1999 | Kao | 160/370.22 |
| 6,267,431 B1 | * 7/2001 | Watkins | 296/97.4 |

FOREIGN PATENT DOCUMENTS

| | | | | |
|---|---|---|---|---|
| BE | 1010955 | * | 3/1999 | |
| DE | 19962115 | * | 7/2001 | |
| GB | 2263678 | * | 8/1993 | |
| GB | 2273085 | * | 6/1994 | |
| GB | 2334933 | * | 9/1999 | |
| JP | 60-261725 | * | 12/1985 | |
| JP | 64-83219 | * | 3/1989 | |
| JP | 1-182121 | * | 7/1989 | |
| JP | 6-40253 | * | 2/1994 | 296/97.4 |
| JP | 6-193367 | * | 7/1994 | |
| JP | 9-11745 | * | 1/1997 | |
| KR | 97034959 | * | 7/1997 | |

\* cited by examiner

Primary Examiner—John A. Jeffery

(57) ABSTRACT

An automated sunshade and defrosting assembly for protecting automotive interior surfaces and decreasing windshield defrosting time, includes a pair of tracks designed for coupling on opposite sides of a windshield of a vehicle. A sunshade member extends between the pair of tracks. The sunshade is extendable into an extended position defined by the sunshade covering the windshield. The sunshade is retractable into a retracted position defined by the sunshade uncovering the windshield. A heating element extends through the sunshade for selectively heating the windshield for preventing frost buildup on the windshield. A control unit is provided for selectively extending and retracting the sunshade between the extended and retracted positions.

17 Claims, 2 Drawing Sheets

AUTOMATED SUNSHADE AND DEFROSTING ASSEMBLY

BACKGROUND OF THE INVENTION

1. Field of the Invention

The present invention relates to sunshades and more particularly pertains to a new automated sunshade and defrosting assembly for protecting automotive interior surfaces and decreasing windshield defrosting time.

2. Description of the Prior Art

The use of sunshades is known in the prior art. More specifically, sunshades heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. Des. 293,428; U.S. Pat. No. 3,624,354; U.S. Pat. No. 4,004,126; U.S. Pat. No. 5,290,085; U.S. Pat. No. 5,751,488; and U.S. Pat. No. 5,804,799.

While these devices fulfill their respective, particular objectives and requirements, the aforementioned patents do not disclose a new automated sunshade and defrosting assembly. The inventive device includes an automated sunshade and defroster assembly. A pair of tracks designed for coupling on opposite sides of a windshield of a vehicle. A sunshade member extending between the pair of tracks. The sunshade is extendable into an extended position defined by the sunshade covering the windshield. The sunshade is retractable into a retracted position defined by the sunshade uncovering the windshield. A heating element extending through the sunshade for selectively heating the windshield for preventing frost buildup on the windshield. A control unit for selectively extending and retracting the sunshade between the extended and retracted positions.

In these respects, the automated sunshade and defrosting assembly according to the present invention substantially departs from the conventional concepts and designs of the prior art, and in so doing provides an apparatus primarily developed for the purpose of protecting automotive interior surfaces and decreasing windshield defrosting time.

SUMMARY OF THE INVENTION

In view of the foregoing disadvantages inherent in the known types of sunshades now present in the prior art, the present invention provides a new automated sunshade and defrosting assembly construction wherein the same can be utilized for protecting automotive interior surfaces and decreasing windshield defrosting time.

The general purpose of the present invention, which will be described subsequently in greater detail, is to provide a new automated sunshade and defrosting assembly apparatus and method which has many of the advantages of the sunshades mentioned heretofore and many novel features that result in a new automated sunshade and defrosting assembly which is not anticipated, rendered obvious, suggested, or even implied by any of the prior art sunshades, either alone or in any combination thereof.

To attain this, the present invention generally comprises an automated sunshade and defroster assembly. A pair of tracks designed for coupling on opposite sides of a windshield of a vehicle. A sunshade member extending between the pair of tracks. The sunshade is extendable into an extended position defined by the sunshade covering the windshield. The sunshade is retractable into a retracted position defined by the sunshade uncovering the windshield. A heating element extending through the sunshade for selectively heating the windshield for preventing frost buildup on the windshield. A control unit for selectively extending and retracting the sunshade between the extended and retracted positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automated sunshade and defrosting assembly apparatus and method which has many of the advantages of the sunshades mentioned heretofore and many novel features that result in a new automated sunshade and defrosting assembly which is not anticipated, rendered obvious, suggested, or even implied by any of the prior art heatable sunshades, either alone or in any combination thereof.

It is another object of the present invention to provide a new automated sunshade and defrosting assembly which may be easily and efficiently manufactured and marketed.

It is a further object of the present invention to provide a new automated sunshade and defrosting assembly which is of a durable and reliable construction.

An even further object of the present invention is to provide a new automated sunshade and defrosting assembly which is susceptible of a low cost of manufacture with regard to both materials and labor, and which accordingly is then susceptible of low prices of sale to the consuming public, thereby making such automated sunshade and defrosting assembly economically available to the buying public.

Still yet another object of the present invention is to provide a new automated sunshade and defrosting assembly which provides in the apparatuses and methods of the prior art some of the advantages thereof, while simultaneously overcoming some of the disadvantages normally associated therewith.

Still another object of the present invention is to provide a new automated sunshade and defrosting assembly for protecting automotive interior surfaces and decreasing windshield defrosting time.

Yet another object of the present invention is to provide a new automated sunshade and defrosting assembly which includes a pair of tracks designed for coupling on opposite sides of a windshield of a vehicle. A sunshade member extending between the pair of tracks. The sunshade is extendable into an extended position defined by the sunshade covering the windshield. The sunshade is retractable into a retracted position defined by the sunshade uncovering the windshield. A heating element extends through the sunshade for selectively heating the windshield for preventing frost buildup on the windshield. A control unit is provided for selectively extending and retracting the sunshade between the extended and retracted positions.

Still yet another object of the present invention is to provide a new automated sunshade and defrosting assembly of differing sizes and colors so that they may be used in existing automobiles.

Even still another object of the present invention is to provide a new automated sunshade and defrosting assembly that covers the entire inside of the windshield surface, resulting in quicker defrosting time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
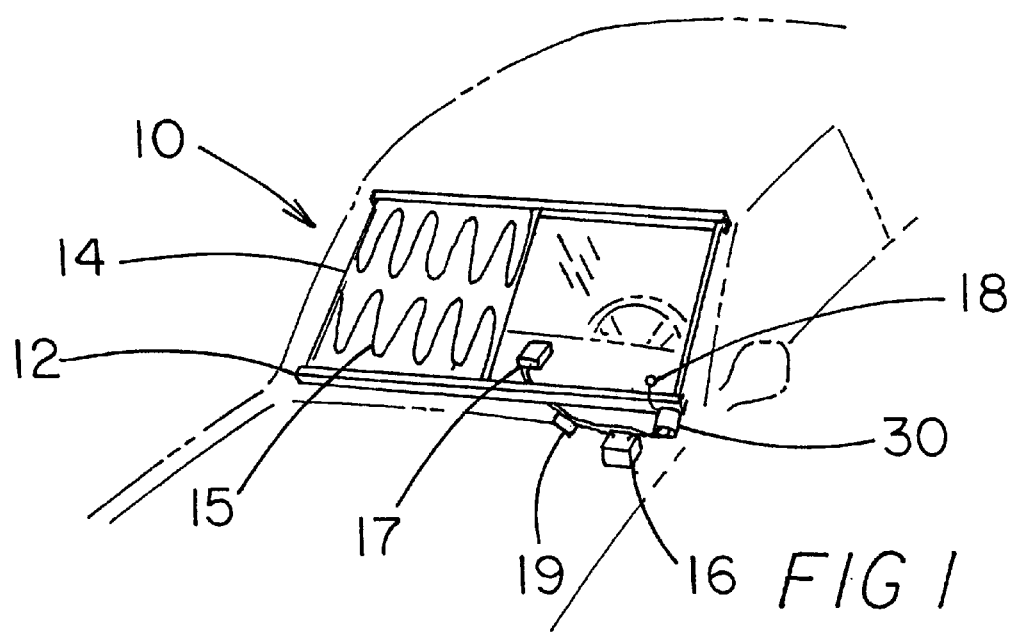
FIG. 1 is a perspective view of a new automated sunshade and defrosting assembly according to the present invention.
Figure 2:
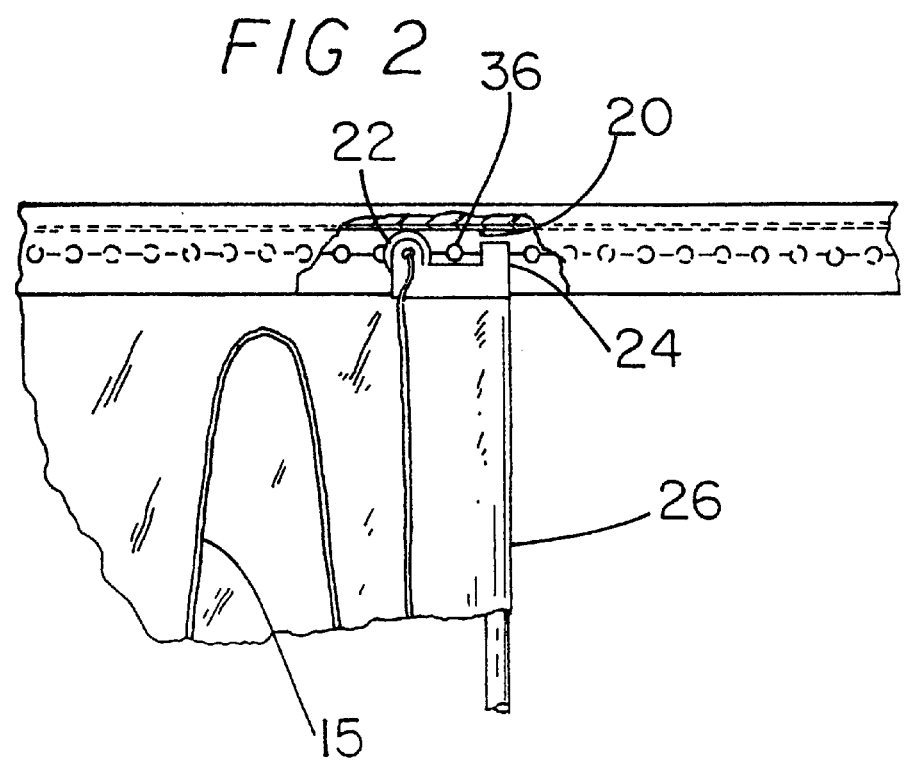
FIG. 2 is a front view of the present invention.
Figure 3:
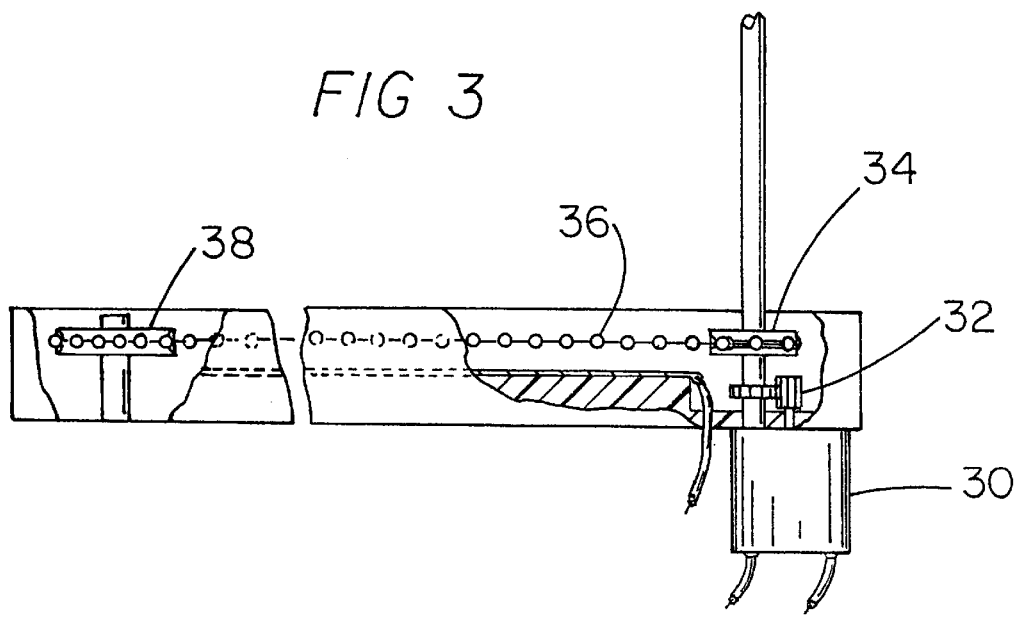
FIG. 3 partial cut-away top view of the present invention.
Figure 4:
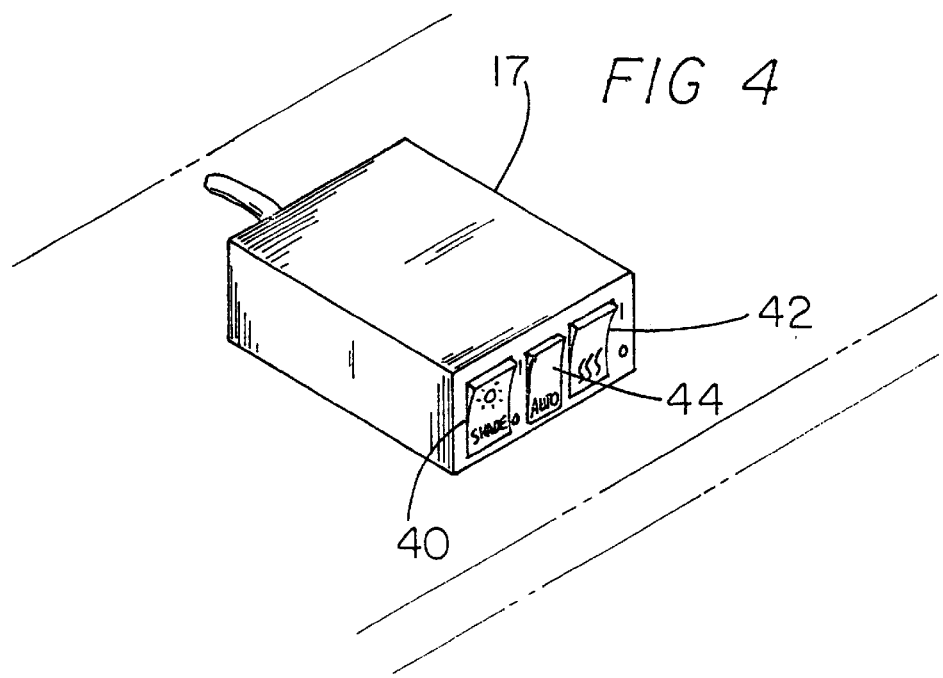
FIG. 4 is a perspective view of the present invention.

With reference now to the drawings, and in particular to FIGS. 1 through 4 thereof, a new automated sunshade and defrosting assembly embodying the principles and concepts of the present invention and generally designated by the reference numeral 10 will be described.

As best illustrated in FIGS. 1 through 4, the automated sunshade and defrosting assembly 10 generally comprises a pair of tracks 12 designed for coupling on opposite sides of a windshield of a vehicle. A sunshade member 14 extends between the pair of tracks. The sunshade is extendable into an extended position defined by the sunshade covering the windshield. The sunshade is also retractable into a retracted position defined by the sunshade uncovering the windshield.

The sunshade member includes a pair of heating elements 15 extending through the sunshade for selectively heating the windshield for preventing frost buildup on the windshield.

The automated sunshade and defrosting assembly also comprises a control unit 17 for selectively extending and retracting the sunshade between the extended and retracted positions. The control unit is designed for positioning in a passenger compartment of a vehicle.

The automated sunshade and defrosting assembly further comprises a temperature sensor 18 designed for coupling to the windshield for sensing the temperature of the windshield. The temperature sensor is operationally coupled to the control unit such that the control unit extends the sunshade into the extended position and activates the heating element upon sensing of a windshield temperature below a pre-determined lower temperature limit. The temperature sensor is also operationally coupled to the control unit such that the control unit extends the sunshade into the extended position upon the temperature sensor sensing a temperature above a pre-determined upper temperature limit.

The automated sunshade and defrosting assembly also comprises a motor 30 operationally coupled to the control unit. The motor includes a drive shaft 32 extending from the motor. The motor is used for selectively turning the drive shaft. The drive shaft is coupled to a pair of sprockets 34 such that the sprockets rotate when the motor turns the drive shaft. Each sprocket is coupled to an associated one of the tracks. The sprockets are coupled to a pair of chains 36.

The chains are coupled to extend along an associated one of the tracks between an associated fixed gear 38 and an associated one of the sprockets. The chains are coupled to a pair of opposite ends 24 of a leading edge 26 of the sunshade. The sunshade is extendable and retractable by the motor rotating the drive shaft and activating the chain.

The electricity to extend and retract the sunshade is provided by a pair of conducting strips 20 extending along an associated one of the tracks. The conducting strips are electrically coupled to the control unit for selectively providing electrical current to the conducting strip. The conducting strips are coupled to a pair of conducting rollers 22. The conducting rollers extend from the sunshade for contacting an associated one of the conducting strips.

The conducting rollers are electrically coupled to the heating element making the heating element actuatable by the control unit when the control unit provides electrical current to the associated conducting strip.

The control unit includes a shade switch 40 positionable between an open position and a closed position. The control unit controls the sunshade by extending the sunshade into the extended position when the shade switch is in the closed position and retracting the sunshade into the retracted position when the shade switch is in the open position.

The control unit also includes a defroster switch 42 with an on position and an off position. The heating element is activated by the control unit when the defrost switch is in the on position and deactivating the heating element when the defrost switch is in the off position.

The control unit further includes an automatic switch 44 with an activated position and a deactivated position. The temperature sensor is activated for automatically extending and retracting the sunshade and automatically activating the heating element only when the automatic switch is in the activated position.

The control unit is also coupled to an auxiliary battery 16 for providing power to the control unit when the vehicle is not on. The auxiliary battery makes the automated sunshade and defrosting assembly operable when the vehicle is not in use.

The control unit is additionally coupled to an ignition sensor 19 designed for sensing when the vehicle is running. The ignition sensor is operationally coupled to the control unit for preventing the control unit from extending the sunshade into the extended position while the vehicle is running.

In use, the automated sunshade and defrosting assembly serves a dual purpose of providing an automobile owner with a sunshade in the summer and a defrosting mechanism in the winter. In the summer months an automobile owner may protect a car's interior from potential sun damage by extending the sunshade with the sunshade switch located on the control unit. In winter months an automobile owner may decrease the time it takes to defrost his or her windshield by activating the defrost switch also located on the control unit. The reduction in defrosting time is accomplished by providing an electric current through a heating element located within the sunshade.

An automatic switch located on the control unit allows an automobile owner the convience of protecting the car's interior or defrosting the car's windshield without being present. The automatic switch extends or retracts, as well as defrost, by monitoring the windshield's temperature. If a pre-determined maximum temperature is obtained, the automatic sunshield extends. If a pre-determined mininmum temperature is obtained, the automatic sunshield extends and begins to defrost. An ignition sensor prevents the sunshield from extending whenever automobile is running.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automated sunshade and defroster assembly comprising:

a pair of tracks adapted for coupling on opposite sides of a windshield of a vehicle;

a sunshade member extending between said pair of tracks, said sunshade being extendable into an extended position defined by said sunshade covering the windshield, said sunshade being retractable into a retracted position defined by said sunshade uncovering the windshield;

a heating element extending through said sunshade for selectively heating said windshield for preventing frost buildup on said windshield;

a control unit for selectively extending and retracting said sunshade between said extended and retracted positions;

a temperature sensor adapted for coupling to the windshield, said temperature sensor being operationally coupled to said control unit such that said control unit extends said sunshade into said extended position and activates said heating element upon sensing of a windshield temperature below a pre-determined lower temperature limit; and an automatic switch having an activated position and a deactivated position, said temperature sensor being activated for automatically extending and retracting said sunshade and automatically activating said heating element only when said automatic switch is in said activated position.

2. The automated sunshade and defroster assembly of claim 1, further comprising:

said temperature sensor being operationally coupled to said control unit such that said control unit extends said sunshade into said extended position upon said temperature sensor sensing a temperature above a predetermined upper temperature limit.

3. The automated sunshade and defroster assembly of claim 1, further comprising:

an ignition sensor adapted for sensing when the vehicle is running, said ignition sensor being operationally coupled to said control unit for preventing said control unit from extending said sunshade into said extended position while said vehicle is running.

4. The automated sunshade and defroster assembly of claim 1, further comprising:

a motor operationally coupled to said control unit;

a drive shaft extending from said motor, said motor being for selectively turning said drive shaft;

a pair of sprockets coupled to said drive shaft such that said sprockets rotate when said drive shaft is turned by said motor, each sprocket being coupled to an associated one of said tracks;

a pair of chains, each chain being coupled to extend along an associated one of said tracks between an associated fixed gear and an associated one of said sprockets; and each of a pair of opposite ends of a leading edge of said sunshade being coupled to an associated one of said chains whereby said sunshade is extendable and retractable by said motor rotating said drive shaft.

5. The automated sunshade and defroster assembly of claim 1, further comprising:

said control unit having a shade switch positionable between an open position and a closed position, said control unit extending said sunshade into said extended position when said shade switch is in said closed position and said control unit retracting said sunshade into said retracted position when said shade switch is in said open position.

6. The automated sunshade and defroster assembly of claim 1, further comprising:

said control unit including a defroster switch having an on position and an off position, said heating element being activated by said control unit when said defrost switch is in said on position and said control unit deactivating said heating element when said defrost switch is in said off position.

7. The automated sunshade and defroster assembly of claim 1, further comprising:

an auxiliary battery coupled to said control unit for providing power to said control unit whereby said control unit is operable when the vehicle is not in use.

8. An automated sunshade and defroster assembly comprising:

a pair of tracks adapted for coupling on opposite sides of a windshield of a vehicle;

a sunshade member extending between said pair of tracks, said sunshade being extendable into an extended position defined by said sunshade covering the windshield, said sunshade being retractable into a retracted position defined by said sunshade uncovering the windshield;

a heating element extending through said sunshade for selectively heating said windshield for preventing frost buildup on said windshield;

a control unit for selectively extending and retracting said sunshade between said extended and retracted positions;

a conducting strip extending along one of said tracks, said conducting strip being electrically coupled to said control unit for selectively providing electrical current to said conducting strip;

a conducting roller extending from said sunshade for contacting said conducting strip; and said heating element being electrically coupled to said conducting roller whereby said heating element is actuatable by said control unit when said control unit provides electrical current to said conducting strip.

9. The automated sunshade and defroster assembly of claim 8, further comprising:

a temperature sensor adapted for coupling to the windshield, said temperature sensor being operationally coupled to said control unit such that said control unit extends said sunshade into said extended position and activates said heating element upon sensing of a windshield temperature below a pre-determined lower temperature limit.

10. The automated sunshade and defroster assembly of claim 8, further comprising:

a temperature sensor adapted for coupling to the windshield, said temperature sensor being operationally coupled to said control unit such that said control unit extends said sunshade into said extended position and activates said heating element upon sensing of a windshield temperature below a pre-determined lower temperature limit; and said temperature sensor being operationally coupled to said control unit such that said control unit extends said sunshade into said extended position upon said temperature sensor sensing a temperature above a predetermined upper temperature limit.

11. The automated sunshade and defroster assembly of claim 8, further comprising:

a motor operationally coupled to said control unit;

a drive shaft extending from said motor, said motor being for selectively turning said drive shaft;

a pair of sprockets coupled to said drive shaft such that said sprockets rotate when said drive shaft is turned by said motor, each sprocket being coupled to an associated one of said tracks;

a pair of chains. each chain being coupled to extend along an associated one of said tracks between an associated fixed gear and an associated one of said sprockets; and each of a pair of opposite ends of a leading edge of said sunshade being coupled to an associated one of said chains whereby said sunshade is extendable and retractable by said motor rotating said drive shaft.

12. The automated sunshade and defroster assembly of claim 8, further comprising:

said control unit having a shade switch positionable between an open position and a closed position, said control unit extending said sunshade into said extended position when said shade switch is in said closed position and said control unit retracting said sunshade into said retracted position when said shade switch is in said open position.

13. The automated sunshade and defroster assembly of claim 8, further comprising:

said control unit including a defroster switch having an on position and an off position, said heating element being activated by said control unit when said defrost switch is in said on position and said control unit deactivating said heating element when said defrost switch is in said off position.

14. The automated sunshade and defroster assembly of claim 8 further comprising:

a temperature sensor adapted for coupling to the windshield, said temperature sensor being operationally coupled to said control unit such that said control unit extends said sunshade into said extended position and activates said heating element upon sensing of a windshield temperature below a pre-determined lower temperature limit; and an automatic switch having an activated position and a deactivated position, said temperature sensor being activated for automatically extending and retracting said sunshade and automatically activating said heating element only when said automatic switch is in said activated position.

15. The automated sunshade and defroster assembly of claim 14, further comprising:

an ignition sensor adapted for sensing when the vehicle is running, said ignition sensor being operationally coupled to said control unit for preventing said control unit from extending said sunshade into said extended position while said vehicle is running.

16. The automated sunshade and defroster assembly of claim 8, further comprising:

an auxiliary battery coupled to said control unit for providing power to said control unit whereby said control unit is operable when the vehicle is not in use.

17. An automated sunshade and defroster assembly comprising:

a pair of tracks adapted for coupling on opposite sides of a windshield of a vehicle;

a sunshade member extending between said pair of tracks, said sunshade being extendable into an extended position defined by said sunshade covering the windshield, said sunshade being retractable into a retracted position defined by said sunshade uncovering the windshield;

a pair of heating elements extending through said sunshade for selectively heating said windshield for preventing frost buildup on said windshield;

a control unit for selectively extending and retracting said sunshade between said extended and retracted positions, said control unit being adapted for positioning in a passenger compartment of the vehicle;

a temperature sensor adapted for coupling to the windshield for sensing a temperature of the windshield, said temperature sensor being operationally coupled to said control unit such that said control unit extends said sunshade into said extended position and activates said heating element upon sensing of a windshield temperature below a pre-determined lower temperature limit;

said temperature sensor being operationally coupled to said control unit such that said control unit extends said sunshade into said extended position upon said temperature sensor sensing a temperature above a pre-determined upper temperature limit;

a motor operationally coupled to said control unit;

a drive shaft extending from said motor, said motor being for selectively turning said drive shaft;

a pair of sprockets coupled to said drive shaft such that said sprockets rotate when said drive shaft is turned by said motor, each sprocket being coupled to an associated one of said tracks;

a pair of chains, each chain being coupled to extend along an associated one of said tracks between an associated fixed gear and an associated one of said sprockets;

each of a pair of opposite ends of a leading edge of said sunshade being coupled to an associated one of said chains whereby said sunshade is extendable and retractable by said motor rotating said drive shaft;

a pair of conducting strips, each conducting strip extending along an associated one of said tracks, each said conducting strip being electrically coupled to said control unit for selectively providing electrical current to said conducting strip;

a pair of conducting rollers, each conducting roller extending from said sunshade for contacting an associated one of said conducting strips;

each said heating element being electrically coupled to an associated one of said conducting rollers whereby said heating element is actuatable by said control unit when said control unit provides electrical current to said associated conducting strip;

said control unit having a shade switch positionable between an open position and a closed position, said control unit extending said sunshade into said extended position when said shade switch is in said closed position and said control unit retracting said sunshade into said retracted position when said shade switch is in said open position;

said control unit including a defroster switch having an on position and an off position, said heating element being activated by said control unit when said defrost switch is in said on position and said control unit deactivating said heating element when said defrost switch is in said off position;

an automatic switch having an activated position and a deactivated position, said temperature sensor being activated for automatically extending and retracting said sunshade and automatically activating said heating element only when said automatic switch is in said activated position;

an auxiliary battery coupled to said control unit for providing power to said control unit whereby said control unit is operable when the vehicle is not in use; and an ignition sensor adapted for sensing when the vehicle is running, said ignition sensor being operationally coupled to said control unit for preventing said control unit from extending said sunshade into said extended position while said vehicle is running.

* * * * *